March 10, 1936.  W. R. MITTENDORF  2,033,890
STOKER
Filed May 14, 1934
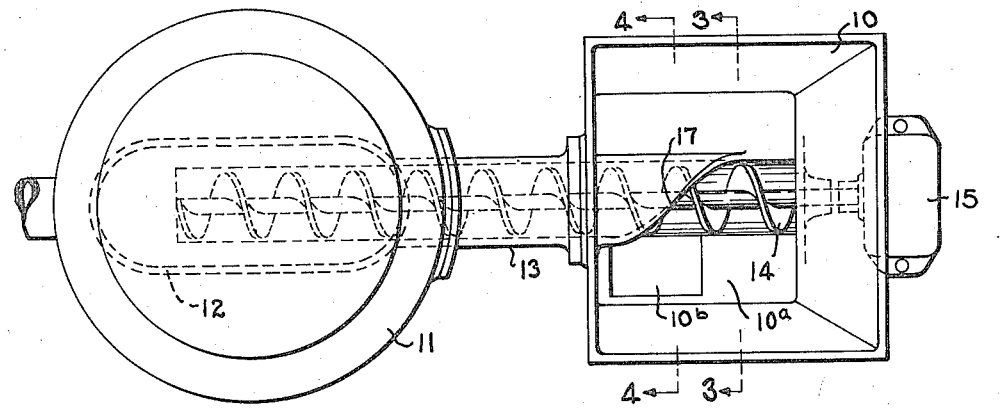
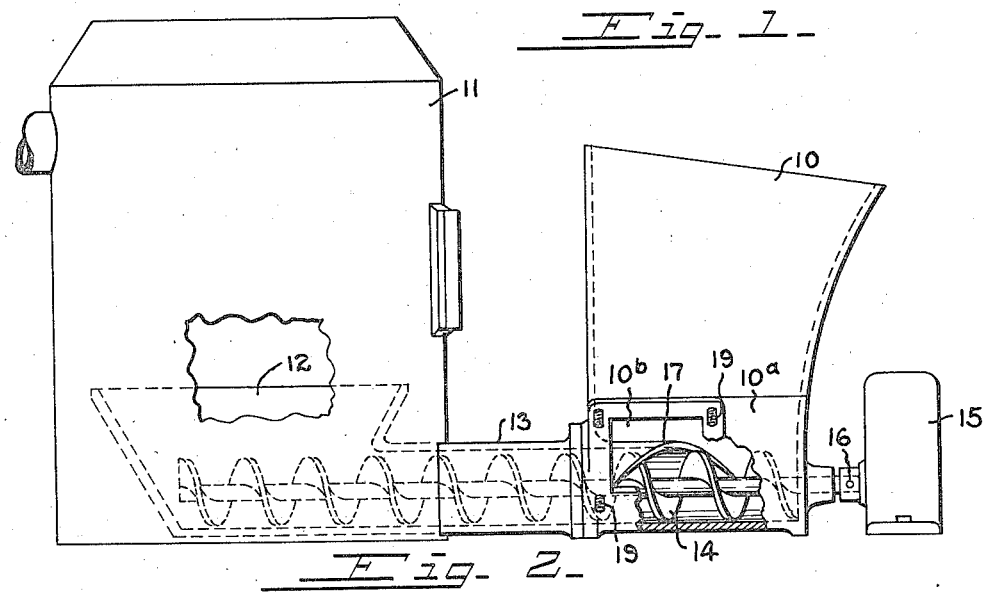
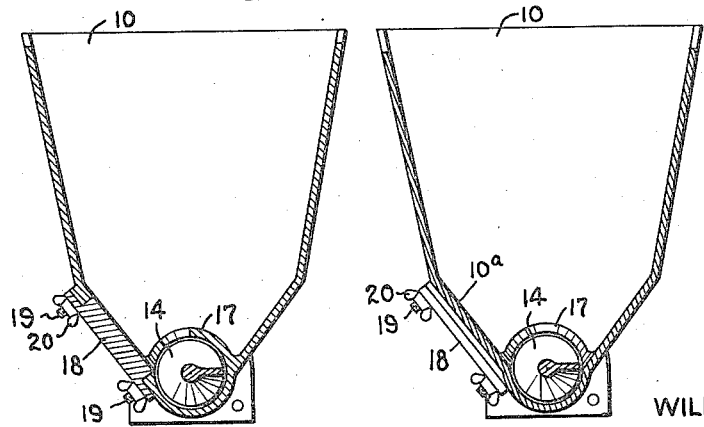
INVENTOR
WILLIAM R. MITTENDORF.
BY
H. C. Karl.
ATTORNEY Patented Mar. 10, 1936

2,033,890

UNITED STATES PATENT OFFICE 2,033,890

STOKER

William R. Mittendorf, Cincinnati, Ohio, assignor to The E. H. Bardes Range & Foundry Company, Cincinnati, Ohio, a corporation of Ohio Application May 14, 1934, Serial No. 725,419

4 Claims. (Cl. 198—64)

This invention relates to coal stokers and analogous devices. Such apparatus usually comprises a coal hopper, a retort, and a rotating screw conveyor driven by a power device and adapted to feed the coal from the hopper through a conduit to the retort.

It is common to have one end portion of the conveyor within the hopper, the other end portion within the retort and the intervening portion fully enclosed by the conduit which extends from the hopper to the retort. Thus, the coal in the hopper is fed to the conveyor by gravity and the conveyor carries it into and through the conduit and deposits it within the retort.

It is also common practice to couple the conveyor to the power device with a severable connection, such as a shear-pin or other expedient, in order to protect the mechanism against damage when a hard extraneous or foreign element, that may be in the coal, becomes caught in the conveyor causing it to jam. Ordinarily, extraneous or foreign matter that may get into the conveyor will invariably become wedged between the vane of the conveyor and the upright wall of the hopper at the entrance to the conduit. This results from the fact that the plane of the hopper wall surrounding the entrance to the conduit is at right angle to the axis of the conveyor. Furthermore, in order to extract foreign matter which thus becomes caught in the conveyor, a portion of the hopper wall at the entrance to the conduit—and sometimes even a portion of the conduit itself—is made removable.

It is also well known that the upright wall of the hopper at the entrance to the conduit, being in a plane at right angle to the axis of the conveyor, serves as an abutment in co-operation with the conveyor to crush lumps of coal. This results in rapid depreciation of the conveyor, in waste of power and, in certain cases, excessive pulverization of the coal—all of which are undesirable.

This invention therefore has for its primary object the provision of means for causing deflection or displacement of foreign matter lying partly within the vanes of the conveyor before it becomes wedged at the entrance to the conduit so that, if possible, it may be maneuvered into a position fully within the vane of the conveyor and thus be able to pass on through the conduit without interference.

Another object is to provide means for easy removal of foreign matter which, due to its size or shape, cannot be displaced sufficiently as to permit it to pass on through and which must therefore become wedged.

Another object is to provide a structure at the entrance to the conduit which will materially reduce pulverization of the coal thus conserving power and lengthening the life of the conveyor.

These and other objects will be apparent from the following description and accompanying drawing, in which:

Fig. 1 is a plan view of a stoker mechanism embodying this invention,

Fig. 2 is a side elevation of the same, with a section of the hopper and furnace broken away.

Fig. 3 is a sectional elevation, taken substantially on the line 3—3 of Fig. 1, and Fig. 4 is a sectional elevation, taken substantially on the line 4—4 of Fig. 1.

In the drawing, 10 represents a coal hopper; 11 represents a conventional type of furnace having a retort 12; a conduit 13 provides a passageway extending from the hopper to the retort; 14 is a screw-type conveyor, one end of which lies within the hopper, the other end within the retort, and the intermediate portion within the conduit. 15 represents a power device which may be of any suitable character for imparting rotary motion to the conveyor 14. The coupling between the power device and the conveyor is preferably a severable connection comprising a shear-pin 16 or any other suitable means that will give way or break should the conveyor become overloaded or jammed.

In order to guard against the probability of hard extraneous or foreign matter becoming jammed between the vane of the conveyor and the hopper at the entrance to the conduit and thus cause the conveying mechanism to become disabled, I have provided means for deflecting or displacing such matter so that, if possible, the extent of the displacement will be sufficient to enable it to pass on through the conduit without interference. To this end, a deflecting structure 17 is arranged within the hopper 10 at the entrance to the conduit 13 and the said structure is preferably formed so as to partially encompass or shroud a portion of the conveyor 14 and the edge of the structure is arranged to extend spirally with relation to the axis of said conveyor and preferably in a direction opposite to the spiral course of the conveyor vane as shown. This arangement provides, in effect, an extension of the conduit within the hopper with the entrance to the conduit lying in a spiral or angular plane in relation to the axis of the conveyor.

Thus, any foreign matter which may enter the path of the conveyor 14 and be carried thereby toward the conduit 13, first encounters the spirally arranged edge of the deflecting structure 17 and is displaced thereby with the probability that the displacement will be sufficient to place the foreign matter fully within the vane of the conveyor thereby enabling it to pass on through the conduit without interference. The natural surface of the spirally arranged edge of the deflecting structure is ordinarily rough enough to cause sufficient displacement but, if desired, said edge may be notched or corrugated in order to accentuate displacement.

However, should any foreign matter be of a size or shape that it cannot be placed fully within the vane of the conveyor, it will then become jammed between the vane of the conveyor, the edge of the deflecting structure 17 and the side wall 10a of the hopper 10 thus stopping rotation of the conveyor 14 and causing the pin 16 to shear. When this occurs, it is necessary to remove the foreign matter and, in order to gain access thereto, I have provided an opening 10b in the hopper wall 10a contiguous to the entrance to the conduit 13. Preferably this opening is normally closed by a plate 18 which fills the opening and serves as a buttress to receive the thrust exerted by the conveyor on the foreign matter that has jammed. This plate is rigidly and securely held in position by any suitable means such as the screw-studs 19 and wing nuts 20.

It will be apparent that lumps of coal, moving toward the entrance of the conduit, will be liable to displacement by the edge of the structure 17 and that many lumps will thereby avoid being crushed. Therefore, the structure 17 increases the efficiency of the stoker mechanism by reducing the extent of pulverization of the coal and conserving power and protects the conveyor against excessive wear and tear.

Having thus fully described my invention, what I claim as new and desire to secure by Letters Patent, is:

1. In a coal conveying mechanism for stokers comprising a rotatable screw conveyor, a structure constituting a sector of a cylindric tube, said structure being arranged concentrically with the axis of said conveyor and having an edge face equivalent to the wall section of said tube, said edge face being disposed spirally with relation to said axis and in opposed direction to the spiral course of said screw, said sector extending closely over the top of said conveyor and said edge face beginning at the level of said axis at one side of said conveyor and extending over said conveyor to the said level at the opposite side, whereby said edge face will cooperate with said conveyor to cause displacement of objects encountering said conveyor above the level of said axis and lying partly within the flights of said conveyor.

2. A hopper for coal stokers comprising a bottom wall adapted to closely encompass a rotatable screw conveyor below the axis thereof, and an upright wall having a circular delivery opening adapted to surround said conveyor, said hopper being provided with a deflecting structure constituting a sector of a cylindric tube extending from said upright wall above and longitudinally of said conveyor, said structure being arranged concentrically with the axis of said conveyor and having an edge face equivalent to the wall section of said tube, said edge face being disposed spirally with relation to said axis and in opposed direction to the spiral course of said screw, said sector being adapted to extend closely over the top of said conveyor and said edge face beginning at the level of said axis at one side of said conveyor and extending over said conveyor to the said level at the opposite side, whereby said edge face will cooperate with said conveyor to cause displacement of objects encountering said conveyor above the level of said axis and lying partly within the flights of said conveyor.

3. A hopper for coal stokers comprising side walls and a bottom wall, the latter being adapted to closely encompass a rotatable screw conveyor below the axis thereof, one of said side walls having a circular delivery opening adapted to surround said conveyor, said hopper being provided with a deflecting structure constituting a sector of a cylindric tube extending from one of said side walls above and longitudinally of said conveyor, said structure being arranged concentrically with the axis of said opening and having an edge face equivalent to the wall section of said tube, said edge face being disposed spirally with relation to said axis and in opposed direction to the spiral course of said screw, said sector being adapted to extend closely over the top of said conveyor and said edge face beginning at the level of said axis at one side of said opening and extending over said conveyor to the said level at the opposite side, whereby said edge face will cooperate with said conveyor to cause displacement of objects encountering said conveyor above the level of said axis and lying partly within the flights of said conveyor, another one of said side walls having a removable portion disposed substantially parallel to the axis of said conveyor and adapted to cooperate with said edge face and said conveyor as a buttress to resist the thrust of said conveyor when objects which have not been fully displaced by said deflecting structure become jammed between said conveyor, said structure and said buttress.

4. Coal stoking mechanism comprising in combination, a coal hopper, a cylindric fuel-feed conduit communicating with said hopper, and a screw conveyor horizontally positioned in the bottom of said hopper and extending through said conduit whereby coal is moved from said hopper through said conduit, said hopper having a cylindric passageway axially aligned with said conduit and extending partially within said hopper so as to constitute in effect an extension of said conduit, said passageway being formed above the level of the axis thereof by a portion of said hopper constituting a sector of a cylindric tube having an edge face equivalent to the wall section of said tube, said sector being adapted to extend closely over the top of said conveyor and said edge face being disposed spirally in opposed direction to the spiral course of said screw, said edge face beginning at the level of the axis of said conveyor at one side thereof and extending spirally over said conveyor to the said level at the opposite side so as to provide a deflecting entrance to said passageway which will cooperate with said conveyor to cause displacement of objects encountering said conveyor above the level of said axis and lying partly within the flights of said conveyor.

WILLIAM R. MITTENDORF.